(12) United States Patent
Burgos Enriquez

(10) Patent No.: US 9,850,169 B2
(45) Date of Patent: Dec. 26, 2017

(54) HYDRAULIC MORTAR WITH GLASS

(71) Applicant: ENVIROCEM, S.L., Madrid (ES)

(72) Inventor: Enrique Burgos Enriquez, Madrid (ES)

(73) Assignee: ENVIROCEM, S.L., Madrid (ES)

( * ) Notice: Subject to any disclaimer, the term of this patent is extended or adjusted under 35 U.S.C. 154(b) by 0 days.

(21) Appl. No.: 14/900,846

(22) PCT Filed: Apr. 21, 2014

(86) PCT No.: PCT/ES2014/070339
§ 371 (c)(1),
(2) Date: Dec. 22, 2015

(87) PCT Pub. No.: WO2014/207276
PCT Pub. Date: Dec. 31, 2014

(65) Prior Publication Data
US 2017/0001910 A1 Jan. 5, 2017

(30) Foreign Application Priority Data
Jun. 28, 2013 (ES) .................................. 201330972

(51) Int. Cl.
*C04B 28/14* (2006.01)
*C04B 28/04* (2006.01)
*C04B 14/22* (2006.01)
*C04B 111/00* (2006.01)

(52) U.S. Cl.
CPC .............. *C04B 28/14* (2013.01); *C04B 14/22* (2013.01); *C04B 28/04* (2013.01); *C04B 2111/0075* (2013.01)

(58) Field of Classification Search
CPC ..... C04B 14/22; C04B 14/303; C04B 22/143; C04B 28/04; C04B 28/14; C04B 2111/0075
See application file for complete search history.

(56) References Cited

U.S. PATENT DOCUMENTS

| | | | | |
|---|---|---|---|---|
| 6,776,838 B2 * | 8/2004 | Hemmings | ............. | C03C 3/087 106/711 |
| 7,771,529 B1 * | 8/2010 | McPherson | ............. | C04B 14/22 106/716 |
| 8,137,454 B2 * | 3/2012 | McPherson | ............. | C04B 14/22 106/716 |
| 8,480,802 B2 * | 7/2013 | McPherson | ............. | C04B 14/22 106/716 |
| 2003/0041783 A1 * | 3/2003 | Monawar | ............. | C04B 14/106 106/716 |
| 2006/0130707 A1 * | 6/2006 | Grasso, Jr. | ............. | C04B 14/22 106/697 |
| 2014/0121303 A1 * | 5/2014 | Hagen | ..................... | C04B 20/10 524/5 |

FOREIGN PATENT DOCUMENTS

| | | | |
|---|---|---|---|
| CN | 103408234 A | * | 11/2013 |
| EP | 1422206 A1 | * | 5/2004 |
| EP | 2189428 A2 | * | 5/2010 |
| ES | 2381075 A1 | | 5/2012 |
| ES | 2433105 A1 | | 12/2013 |
| JP | H082951 A | | 1/1996 |
| KR | 20110022776 A | | 3/2011 |
| WO | 0179131 A1 | | 10/2001 |

OTHER PUBLICATIONS

Derwent-Acc-No. 1997-536554, abstract of Switzerland Patent Specification No. CH 688550 A (Nov. 1997).*
International Search Report for international Application No. PCT/ES2014/070339 dated May 29, 2014.

* cited by examiner

*Primary Examiner* — Anthony J Green
(74) *Attorney, Agent, or Firm* — Brown & Michaels, PC

(57) ABSTRACT

Hydraulic mortar with glass, mainly formed by: Cullet to which is added pure white or gray Portland clinker, gypsum and optionally alumina; extra-fine glass subsequently added to the milled product; and natural crushed stone and natural calcareous or siliceous soil, or a mixture of both, or milled glass as a substitute for the natural, calcareous or siliceous stone fines.

11 Claims, No Drawings

HYDRAULIC MORTAR WITH GLASS

BACKGROUND OF THE INVENTION

Field of the Invention

The present invention relates to a calcareous- or siliceous-type stone material, treated with a pozzolanic-type cementitious material, mainly formed by a vitreous and reactive product, mainly intended to build and stabilize outdoor earthen surfaces.

This invention falls within the construction industry, and more specifically within the development industry, although given its natural and eco-friendly character, and the noteworthy reduction of CO2 when it is used instead of Portland cement, it also falls within environmental activities.

STATE OF THE ART

There are many methods and applications on the market for the stabilization of roads and terraces, mainly based on polymers applied on-site, and other traditional ones such as quicklime, soil cement or gravel cement. Some are executed on the existing terrain, and others by adding soil, either to be treated when spread or to be taken prepared from the plant to be spread, leveled and compacted.

European Patent EP1250397B1 is based on the use of milled recycling glass, which makes use of basic reagents such as CaO, sodium or potassium. This patent, although innovative, has the drawback of providing little compressive and tensile strength. Tests carried out following the instructions of this patent yield the following results:

| Age (days in the humidity chamber) | Compressive Strength (MPa) | Tensile Strength (MPa) |
|---|---|---|
| 7 | 2.39 | — |
| 28 | 4.64 | 0.48 |
| 90 | 7.65 | 0.94 |

According to these results, these soils are broken relatively easily; for this reason it is very clear that there is short-term deterioration and release of component material from the soil treated in this way, and of the prepared cementitious materials with crushed stone. Thus, the resulting lifespan of this material is very short, and the free calcium produced causes the migration of the same to the surface with very noticeable efflorescence, especially after continuous rainy periods followed by an increase in temperatures.

DESCRIPTION OF THE INVENTION

By means of the intimate mixture of cement (obtained according to Patent ES2339910B1), which we shall refer to as glass cement (because it includes a majority of glass), with crushed quarry stone having precise particle sizes, and water, depending on its use, a semi-dry mortar shall be obtained, which can be transported in a dump truck due to the slow onset of setting, which in turn will allow for spreading, leveling and compacting, without losing the intrinsic and potential characteristics of such mortar.

The present invention remarkably improves upon the known methods, both because of the compressive strength achieved in the short, medium and long term, as well as the removal of efflorescence and its strongly pozzolanic nature. All the characteristics achieved offer greater durability, and a very noticeable stability, beyond compare with the previous case and other methods commonly used (stabilization with lime, stabilization with cement, with polymers, etc.)

This considerable improvement can be observed both in the system of incorporating the cementitious material directly on the ground (using either a wet or dry system), and in the system of prior mixing in a plant or a mobile mixer, blending together with natural crushed aggregate from the quarry.

In this invention we will use, as the hydraulic binder in its different proportions and applications, the one obtained according to the method of manufacturing and the claims from Patent ES2339910B1, to which we will add something new: including the addition of extra-fine glass as a highly reactive amorphous material.

The present invention is the result of the development of the aforementioned document, especially because it is the same inventor who has carried it out. Conceived and developed as a system to obtain terraces, footpaths, roads, trails, stabilization of highway sub-base, bicycle paths, cattle routes, etc., with a natural earthen appearance, high durability, and with remarkable initial and long-term durability, without any color contribution to the soil or to the cementitious material, thus retaining the color of the aggregate, although natural oxides can be added to the resulting semi-dry mortar to determine the desired color, and even with the strengths developed, no expansion joints are required, so that no shrinkage cracks appear, being a continuous pavement, and besides keeping its initial characteristics intact for a very long period of time.

For the proportions of cementitious material to be used here, we have to always keep in mind that this percentage, both in volume (percentage of the total mass in %), and in the composition of the cement mixture (glass/clinker, gypsum, water, alumina if appropriate, or extra-fine glass) must maintain the characteristics of being a continuous pavement without any possibility of creating cracks due to shrinkage in any type of use or application, and the compressive strengths achieved must not be below or above the following values:

| Days | Compressive strength higher than (MPa): | Compressive strength lower than (MPa): |
|---|---|---|
| 7 | 3-4 | 8-9 |
| 28 | 6-8 | 14-16 |
| 90 | 8-10 | 19-22 |

While our range of percentages and components, including manufacturing methods and possibilities, allow us to achieve lower initial strength levels or higher final strength levels, depending on the product or the use we intend to apply, with substitutive uses and applications, for a vast range of products already executed with Portland cement and its innumerable additions, or other innovative products and applications that can be created.

Considering that the major element, up to 95%, is cullet, and its use involves an enormous benefit for the environment and the society in general, without excluding those territories that have glass but where, due to its low profitability, the glass industry is not present to benefit from and recycle such glass. In these places, glass either ends up in the dump or else is even milled to be used as sand as a filler or for beaches.

In the tests performed, the pozzolanicity has been maintained for more than 365 days.

This cement binder can be directly used on the existing soil, or with soil improved through the external contribution of aggregates, either directly through a dry process or through a wet process, in both cases creating an intimate mixture by means of specific machinery, with the corresponding leveling and final tamping.

To obtain all the properties of this continuous pavement and apply them to different situations (uses, slopes, weather, etc.) we have used percentages of cullet, basically common, domestic or industrial soda-lime glass; we do not rule out others such as CRT, with a single color, a mixture of colors or transparent, mixed with white or gray clinker, gypsum and alumina as the case may be, or else a percentage of 0-10% of extra-fine glass with a particle size of less than one micron, preferably in the range of 0.1-0.5 microns.

The different proportions among its essential components are:
 Glass 95-70%, and optionally
 Clinker, gypsum and alumina or extra-fine glass 5-30%.

This means that a maximum of 95% of glass will be used with its complementary clinker, gypsum and alumina, or extra-fine glass, or its corresponding cement such as Portland cement of types CEM 52.5, CEM 42.5 and CEM 32.5 (white or gray).

And at least a minimum of 70% of glass, with its counterpart of clinker, gypsum and alumina, or extra-fine glass, or its counterpart of cement resulting from using different quantities of gypsum, i.e. CEM 52.5, CEM 42.5 and CEM 32.5 (white or gray).

These mixtures with the glass could be mixed with the cement directly, once the glass is milled to the desired particle size.

The Portland clinker used in the hydraulic mortar can have the following composition: SC3 Tricalcium silicate in a range of 40%-50%; SC2 Dicalcium silicate in a range of 20%-30%; AC3 Tricalcium aluminate in a range of 10%-15%; and AlFe Tetracalcium aluminoferrite in a range of 5%-10%.

Or the components could be added, and these should be milled together, until they are intimately mixed, even alloyed (as we have verified with an electron microscope), with a variable particle size of 0.1 to 30 microns, an average of 14-16 microns and an optimum value of 0.1 to 10 microns, adding when the mix is milled, if appropriate, extra-fine glass with a particle size of 0.1-0.5 microns, to speed up the initial reaction.

We are aware that an external mix using the cement and glass finely milled provides noticeable results, and although we claim these possible methods, the manufacturing system chosen for the obtainment of cementitious material is much more efficient and determinant of the characteristics indicated in the preceding patent, which does not rule out from our side the use of cement which is intimately mixed with the glass and the other elements of this highly pozzolanic mortar.

As an example, we performed tests on this cement mixture using percentages of glass of 80%, plus a 16% counterpart based on pure clinker, gypsum and 4% of extra-fine glass.

Tests performed: Soil tamping test using the Proctor method modified in accordance with the UNE 103501 standard.

The strength tests were made with test pieces with a setting time of 7, 28 and 90 days.

In the first place, we tested a mortar consisting of a mixture of glass milled to 14 microns, and later we carefully mixed it with cement type 52.5 R, and 0.4-0.6 cm siliceous sand with a defined particle size curve, and added water.

Here we can see the results of compressive strength at 7, 28 and 90 days according to the chart and test characteristics below:

Modified Proctor compaction test (UNE 103.501)
Maximum density: 2.19 g/cm3
Optimum moisture: 7.21%
Moisture of the sample using stove drying (UNE 103.300)
Total moisture % of the mix: 6.62
Compressive strength (NLT-310.NLT-305)

| Age (days) | Dry density (g/cm$^2$) | Compression (MPa) |
|---|---|---|
| 7 | 2.23 | 5.91 |
| 7 | 2.23 | 6.23 |
| 28 | 2.22 | 12.53 |
| 28 | 2.23 | 12.86 |
| 90 | 2.23 | 15.38 |
| 90 | 2.24 | 15.95 |

This test will be compared with another one performed with the same base material, i.e. the same sand and characteristic particle size curve, the same quantity of water and binder, with the exception of the manufacturing method, as this cementitious material is the result of a joint milling of the components, even with the same overall particle size as the previous test, i.e. 14 microns, where 14 micron glass was introduced, and finally after the milling we added 4% of extra-fine glass.

Test performed with jointly milled material, common glass, pure Portland clinker and gypsum, plus extra-fine glass.

Test conditions:
Modified Proctor compaction test (UNE. 103.501)
Maximum density: 2.19 g/cm2
Optimum humidity: 6.37%
Moisture of the sample using stove drying (UNE.103.300)
Total moisture % of the sample: 5.65
Compressive strength (NLT-310, NLT-305)

| Age (days) | Dry density (g/cm$^2$) | Compression (MPa) |
|---|---|---|
| 7 | 2.22 | 7.27 |
| 7 | 2.21 | 7.79 |
| 28 | 2.24 | 13.90 |
| 28 | 2.23 | 13.20 |
| 90 | 2.24 | 20.50 |
| 90 | 2.24 | 20.60 |

After verifying and comparing the foregoing tests we can determine—regarding the achieved strengths, when all the materials are jointly milled, and extra-fine glass is added—that there is a remarkable increase in the compressive strengths occurring at all ages, especially at 90 days, and the strengths continue to increase for more than one year due to the strongly pozzolanic nature of the resulting cementitious material. This is influenced by the joint milling, the intimate mixture of the materials, the particle size, and the amorphous nature of the extra-fine glass with a quantity of SiO2 around 70%. This pozzolanic nature maintained over time is what provides the optimum characteristics for the stabilization of terrains and mixtures with the proposed crushed aggregates.

The compressive strength at the age of 28 days is almost twice that obtained at 7 days (an increase of 92%), and the strength obtained after 90 days is more than three times that obtained after 7 days.

We have also considered and tested the substitution of a part of the fine aggregate (limestone or siliceous) with 1-4 mm milled-glass sand, because due to the strongly pozzolanic nature of the cement mixture, it inhibits the alkali-silica reaction. By means of this substitution we would recycle part of the glass which in one way or another ends up at the dump, achieving stable mortars with less absorption of water and which are very eco-friendly.

The compressive strength at the age of 90 days after its immersion in water is 88%, a very high value, which makes it very feasible for use in areas prone to flooding, either due to their proximity to areas with water or to frequent runoff or flooding during rainy periods.

Basic Conditions for Application

It is known that the compressive strengths exhibited by this mortar are based on the load and on its use, that is, they depend on the load-bearing capacity of the soil, which is why we have run prior tests at the laboratory to obtain the different optimum particle sizes of the aggregates based on their use:
Pedestrians and bicycles . . . 0.4-0.6 cm
Light vehicles, occasional use . . . 0.10-0.12 cm
Light vehicles, average use . . . 0.12-0.14 cm
Heavy vehicles, occasional use . . . 0.18-0.20 cm
Livestock transit . . . 0.6-0.8 cm Also, with the same purpose we determined at the laboratory, the average thickness for each use:
Pedestrians and bicycles . . . 5-6 cm
Light vehicles . . . 10-12 cm
Light vehicles, average use . . . 12-14 cm
Heavy vehicles, occasional use . . . 14-16 cm
Livestock transit . . . 6-8 cm Manufacturing and Implementing the Mortar Once the foregoing conditions are met, the material is preferably mixed at the concrete plant with a certified mixer, although it can be performed with mobile mixers, and water is added. The optimum moisture of the mixing in the laboratory is 8%. Once a homogeneous and well-dosed mix is obtained (4-12% of cement binder over the total weight of the mix) or other eligible percentages according to the use and the project.

This pre-mixed material is transported in a dump truck to the application site, then it is spread and leveled. Both operations can be carried out manually or by means of spreading machines, and lastly it is compacted according to thickness, with a freestanding or manual tamping machine, until a modified Proctor value of at least 98% is obtained.

When the application is directly made on the terrain with a dry or wet system, by means of well-known specific machinery, this material is dosed based on prior laboratory testing of the materials. It is intimately mixed, and lastly is compacted until achieving the Proctor value required by the project, usually higher than 98%. Although the quantity of cement present in the cementitious material and the present CaO reaction already create a cementing effect, the real potential will continue to take place over a period of more than one year.

For soils stabilized on-site of types S-EST 1 (stabilized soil 1) and S-EST 2 (stabilized soil 2) (article 512 of the official Spanish guide PG 3) the supporting capacity will be determined through the UNE 103502 CBR determination test at 7 days. The CBR index must be greater than 6 and 12 for stabilized soils S-EST 1 and S-EST 2, respectively. Both limits are comfortably surpassed by the presented material, since its CBR is almost 40 times the value required for an S-EST 2.

What is claimed is:
1. A hydraulic mortar, comprising:
70% to 95% cullet including milled soda-lime glass, at least a first portion of the milled soda-lime glass being extra-fine glass having a particle size under one micron, the extra-fine glass being 4%-30% by weight of the hydraulic mortar; and
cementitious material including Portland clinker having a particle size of 0.1 microns to 30 microns.
2. The hydraulic mortar of claim 1, in which the cullet is transparent, or a mixture of colors.
3. The hydraulic mortar of claim 1, in which the Portland clinker comprises:
SC3 Tricalcium silicate in a range of 40%-50%;
SC2 Dicalcium silicate in a range of 20%-30%;
AC3 Tricalcium aluminate in a range of 10%-15%; and
AlFe Tetracalcium aluminoferrite in a range of 5%-10%.
4. The hydraulic mortar of claim 1, in which the cementitious material has an average particle size in a range of 14-16 microns.
5. The hydraulic mortar of claim 1, in which the cementitious material uses white or gray Portland cement type CEM 52.5, CEM 42.5 and CEM 32.5.
6. The hydraulic mortar of claim 1, in which the cementitious material further comprises alumina.
7. The hydraulic mortar of claim 1, further comprising an aggregate comprising natural crushed stone, natural calcareous soil, siliceous soil, or a second portion of milled soda-lime glass.
8. The hydraulic mortar of claim 3, in which the Portland clinker is white Portland clinker, and the white Portland clinker further comprises $Fe_2O_3$ in a proportion of less than 0.4%.
9. The hydraulic mortar of claim 3, wherein the cullet is greater than 85% by weight of the hydraulic mortar and no more than 95% by weight of the hydraulic mortar.
10. A method of preparing hydraulic mortar, comprising:
providing a quantity of cullet at 70% to 95% by weight of the hydraulic mortar, the quantity of cullet including milled soda-lime glass;
adding to the quantity of cullet a cementitious material including Portland clinker having a particle size of 0.1 microns to 30 microns; and
adding to the quantity of cullet, subsequent to providing the quantity of cullet, a quantity of extra-fine glass, the extra-fine glass having a particle size of less than one micron.
11. A hydraulic mortar comprising:
a first portion of cullet including milled soda-lime glass, the first portion of cullet being greater than 70% by weight of the hydraulic mortar and no more than 95% by weight of the hydraulic mortar, the first portion of cullet including a first portion and a second portion, the first portion being a first portion of extra-fine glass having a particle size under one micron, the second portion having a particle size no less than one micron; and
cementitious material including Portland clinker and a second portion of extra-fine glass, the Portland clinker having a particle size of 0.1 microns to 30 microns, the second portion of extra fine glass having a particle size under one micron, the second portion of extra-fine glass being up to 10% of the cementitious material.

* * * * *